United States Patent Office 2,795,050
Patented June 11, 1957

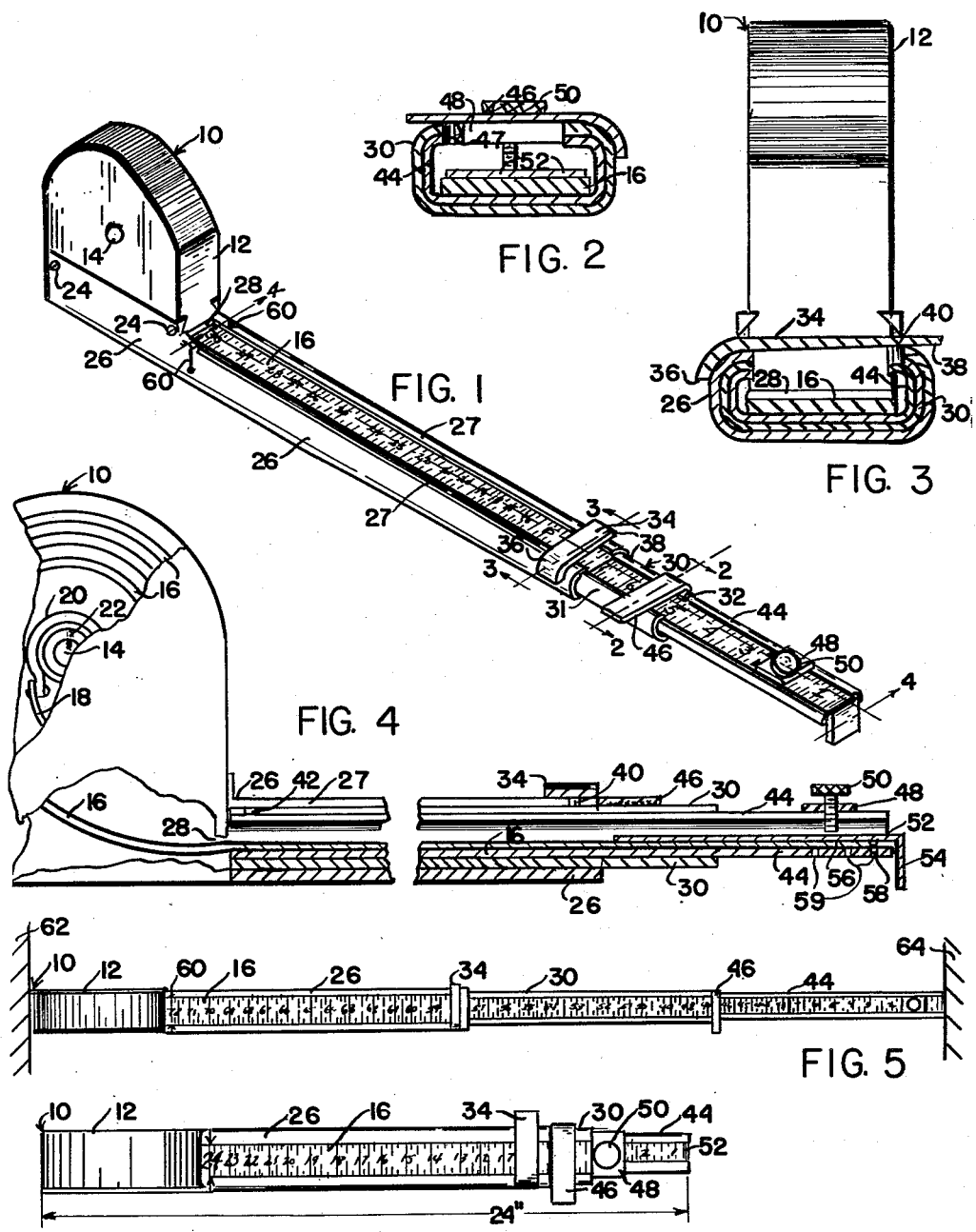

2,795,050

MEASURING RULES

Rodney S. Van Fleet, Decatur, Ga.

Application December 28, 1953, Serial No. 400,534

12 Claims. (Cl. 33—138)

This invention relates to a measuring rule and particularly to a measuring rule of the sort having a rigid, extensible support for a flexible measuring tape.

The most convenient apparatus for measuring linear distances is the conventional flexible tape measure which is normally retracted inside a small casing and which may be extended a great many feet. However, this tape alone has many disadvantages such as the tendency to warp and bend when extended a distance thereby assuming other than a straight line which gives an inaccurate measurement. In addition, the bending of the tape makes it practically impossible for one person to measure long distances or even short distances where there is no flat surface for the tape to rest upon. There is therefore a great need and demand for a measuring device which has the storage compactness and length of the retractable tape and which in addition has the rigidity of a solid flat rule as the tape is extended.

A primary object of this invention is to provide a flexible tape which has an extensible support surface operably combined therewith and being extended to form a rigid support for the tape as it is unwound.

Another object of this invention resides in the construction of a preferred embodiment in which the extensible support compactly retracts against the tape.

An additional object resides in the use of telescopic support members in a preferred embodiment.

A further object resides in the provision of a combined, supported tape with an adjustment thereon for including an allowance for tolerance in one direct reading.

Generally described, the present invention comprises a flexible tape normally coiled and having spring means associated therewith permitting unwinding thereof but tending to return the tape to coiled position, a tape support member, and retractable means on said tape support member having the end portion of the tape attached to the outermost portion thereof and being extensible to form a straight support for said tape, said retractable means having an indicator position thereon to indicate the length of the tape unwound in making a measurement.

Many other objects and advantages of my invention will be apparent from the following description taken in conjunction with the accompanying drawings, in which:

Fig. 1 is a pictorial view of a preferred embodiment of the present invention.

Fig. 2 is a cross-sectional view taken substantially along the line 2—2 of Fig. 1 but with the outer channel fully extended.

Fig. 3 is a cross-sectional view taken substantially along the line 3—3 of Fig. 1.

Fig. 4 is a cross-sectional view taken substantially along the line 4—4 of Fig. 1.

Fig. 5 is a top plan view in reduced size of the device of Fig. 1 in maximum extension.

Fig. 6 is a view identical with that of Fig. 5 but with the device in complete retraction.

Referring to the drawings, a measuring tape device designated generally at 10 consists of a housing 12 pivotally supporting on pivot pin 14 the normally wound coil of a flexible tape rule 16 which has accurate measuring indicia marked or etched thereon. Tape rule 16 may be constructed in conventional fashion from metal or the like and is attached at the inner confined end 18 thereof to a tension spring 20 with one end thereof riveted at 22 to the pivot pin 14 so that the spring 20 is tightened as the tape rule 16 is unwound from its coil thereby placing tension on the tape 16 giving it a tendency to return to its normal coiled position.

The bottom end of housing 12 is attached by screws 24 at the rear channel portion of a rigid support channel 26 protruding from one lower end of the tape housing 12 in a substantially straight line and having arcuate side guides 27. The bottom end of housing 12 is positioned in the channel 26 in such a manner as to place the tape feeding mouth 28 in transverse alignment with the upper, open portion of the channel 26 so that the tape 16 may be fed through the channel with the indicia thereof visible in the open channel portion. Channel 26 is of exact pre-determined size to receive the bottom of tape housing 12 with the front, bottom edge 28 thereof providing one fixed point and abutment surface in linear measurements.

The remainder of the rigid extensible support for the rule 16 is formed in the present embodiment through the use of a series of additional channel members telescopically positioned in the initial channel 26. According to this, a second channel member 30 with side guides 31 is slidably positioned in the side guides 27 of channel 26 and with the outer end 32 thereof extending slightly beyond the outward end of channel 26. In order to prevent channels 26 and 30 from becoming accidentally disengaged upon reaching their maximum extension, a spring clip 34 has one end 36 welded or otherwise fixed to one side guide 27 of channel 26 and extends across the open face of the channel to a point just past the other side guide 27 leaving a terminal end portion 38. Near the terminal end portion 38 of clip 34 is a depending projection or lug 40 passing through a complementary hole in the adjacent side guide 27 and with the lowermost end thereof normally riding on top of the side guide 31 but in position to drop into a hole 42 punched into the innermost end of channel 30 on its side guide 31 and, on maximum extension of channel 30, will drop into hole 42 through the pressure of spring clip 34 curved to keep the projection 40 under pressure against the top of side guide 27. To release channel 30, the tip of a finger is pushed upwardly against the underside of end 38 on clip 34 bringing projection 40 out of hole 42 as the channel 30 is slid into channel 26.

In the present embodiment a third channel 44 is slidably seated in channel 30 and is locked in the manner of channel 30 on channel 26 by means of the second clip fixed on channel 30 with a lug 47 to engage a hole on channel 44. Clip 44 is arranged opposite from clip 34, placing the terminal ends and the respective lugs 40, 47 on opposite sides thereby preventing any malfunction due to a lug dropping into the wrong hole. Clip 46 abuts the end of channel 26 when channel 30 is in retracted position thereby preventing channel 30 from retracting too far. Channel 44 has a plate 48 welded or otherwise fixed transversely on the top and across the open channel face thereof receiving in threaded engagement a set screw 50 having the end thereof directed to the bottom of channel 44 holding in place a short, rigid rule 52 having a downturned end lip 54 depending from the outer end of channel 44 for a purpose to be described. Rule 52 may be of any desired length less than the length of the retracted channels. Plate 48 also serves to prevent channel 44 from retracting too far into channel 30 by engaging the end of channel 30.

In the operation of the rule, the tape 16 is led through the channels a distance substantially equal to the length of the channels in fully retracted condition and the end of the tape 16 is fixed by a pin 58 fixed on tape 16 and then selectively attached to the end portion of channel in one of a series of aligned holes, 59. The exact length in fully retracted condition between two fixed points, such as from flat end 28 to the end portion 54, having been determined, such as 24" used herein for purpose of illustration, a zero or indicator index mark 60 is permanently scribed on one of the channels preferably on channel 26 near the mouth 28 of tape housing 12, and tape 16 having been locked by pin 58 with the tape number corresponding to the collapsed length between the two points, in this case 24", in exact alignment with the index mark 60, the rule is now ready to make measurements. As the channels 26, 30, 44 are extended the tape 16 will likewise be extended through the channels an exact corresponding amount which is readily readable at the index 60. Through the use of the rigid rule 52, which is adjustable under set screw 50, allowances for tolerance may be readily made, for example where measurements are being made of a door frame and one wishes to allow a clearance of ¼" all around between the door and the frame. Normally measurements would be made of the exact size of the frame and then ¼" subtracted from each; however, by extending rule 52 ¼" from the end of channel 44 all measurements read at the index 60 will be ¼" short which exactly and automatically allows the desired tolerance. The depending lip 54 on rule 52 provides a flat surface which may be hooked over the top of an outside frame or the like when making measurements. The thickness of lip 54 is usually immaterial if sufficiently thin; however, if desired, rule 52 or tape 16 may be moved to compensate for this.

In Fig. 5 the rule 16 is measuring between two opposed surfaces 62, 64 and channels 26, 30, 44 are substantially fully extended with the rule 16 rigidly supported thereby. With this arrangement, such wide distances may be readily measured by only one person, who merely extends the rule and supports it in one hand while reading directly opposite index 60 for the correct measurement. Similarly the rule may be readily used by one person to measure horizontal or vertical distances either inside or outside such things as window frames, door frames, and the like. When the rule is not in use, it is retracted to the condition shown in Fig. 6 and is readily carried or stored; and if desired small or larger versions of the rule may be manufactured simply by making the channels longer or shorter and through the use of longer or shorter tape 16.

Although for illustrative purpose I have shown and described a preferred embodiment of my invention various alterations, eliminations, substitutions, and modifications may be made in the disclosed device without departing from the scope of the invention as defined in the appended claims.

I claim:

1. In a portable, hand operated measuring rule of the class described, a flexible tape, a storage means for said tape, a rigid support for the outward end of said tape, rigid extensible means fixedly associated with said support for extending said tape and for supporting said tape in rigid aligned extension throughout the entire length of said tape as it is extended, and indicator means for showing the length of tape extended from an initial position in measuring between two fixed points on said rule.

2. In a portable, hand operated measuring rule of the class described, a flexible tape, a storage means for said tape, a rigid guide means for one end of said tape as it is fed therethrough, an extensible support means mounted in association with said tape adjacent said guide means and having said tape fixed thereto at one point thereon, said support means being extensible to form a substantially straight support surface for the tape extended, and indicator means for showing the length of tape extended from an initial position in measuring between two fixed points on said rule.

3. In a portable, hand operated measuring rule of the class described, a flexible tape having indicia thereon, storage means for said tape, tension means resisting the extension of said tape, means fixed on a portion of said tape for extending and rigidly supporting said tape throughout the entire extended length thereof, said means being retractable as said tape is returned to storage, and indicator means on said measuring rule indicating the initial distance between two fixed points when the tape is retracted as well as indicating the adjusted length between the two points when the tape is extended in measuring.

4. In a portable, hand operated measuring rule of the class described, a flexible tape having indicia thereon, storage means for said tape in stored condition, means directing said tape to stored condition, guide means for assisting movement of the tape when it is moved from stored condition, extension support means having one end thereof mounted adjacent said tape guide means and adapted to extend to a rigid, straight surface supporting said tape as the tape is fed outwardly from said storage means, said extension support means having a portion thereof near the outer end thereof fixed to said tape so as to extend the tape upon extension thereof, and indicator means on said rule indicating on said tape the initial distance between two fixed points on said rule as well as the extent of movement of said support.

5. The device in claim 4 in which a rigid rule is carried by said extension support means from the terminal end thereof and above said tape, said rigid rule having indicia thereon, and adjustable lock means for movably locking said rule on said extensible support means.

6. In a portable, hand operated measuring rule of the class described, a first rigid support member having a straight flat tape support surface, a tape storage means mounted on said first support member and having a flexible measuring tape normally stored therein with a guide exit for guiding the tape across said tape support surface, tension means on said tape storage means normally maintaining said unwound tape under tension, and rigid extensible tape support surface means mounted for aligned and straight extension on said first support member and having the terminal end of the tape secured at a point thereon with a portion of the tape in aligned support thereon, said extensible support surface means providing a rigid support for the tape as it is unwound by the extension of said extensible support surface means.

7. In a portable, hand operated measuring rule of the class described, a flexible tape rule having indicia thereon, a storage means for receiving the tape in retracted condition and having means thereon guiding the feeding of the tape straight therefrom, a plurality of extensible tape support members retractible to shortened condition and having an entrance thereto mounted adjacent said tape feeding means with a portion of said tape supported thereon in collapsed condition, the furthermost of said extensible members having the end thereof fixed to the end of said tape so that said tape is carried by the outermost of said extensible members across said other extensible members for support thereby, said support members providing a rigid support for said flexible tape in extension, and indicating means adapted to indicate the initial length as well as the extent of extension between two fixed points on said tape rule.

8. In a portable, hand operated measuring rule of the class described, a flexible tape having indicia thereon, a first support means for said tape, guide means for assisting the movement of said tape from extended to collapsed condition, said first tape support means extending to form a straight flat tape support surface and having a portion thereof underlying a portion of said tape, at least one other straight support surface member mounted for movement on said first support surface for telescopic engagement therewith and carrying a portion of said tape thereon with the end of said tape fixed thereto, lock means on one of said support members preventing complete disengagement between said support members, an indicator on one of said support surfaces located to indicate on said tape the distance between fixed points on said support members in retracted position, said tape being extended with and supported on said movable support surface as it is extended on said first support surface and indicating at said index the adjusted length of said support member between said fixed points.

9. In a portable, hand operated measuring rule of the class described, a tape support member having a rigid straight tape support surface, a tape storage means mounted on said support member and having a flexible measuring tape normally stored therein, guide means on said support surface retaining and guiding said tape as it moved thereacross, a second tape support member mounted for aligned extension on said first tape support member and having tape guide means retaining the tape thereon during movement, retractible lock means on one of said support members for locking said members in extended position, a plurality of other extension support members mounted for aligned extension on said first support member and each having tape guide means thereon, said tape having the zero end thereof fixed on the outermost of said support members and being movable across the other support members, measuring indicia on said tape visible on at least one of said extension members, and an index at the point of visibility on said support member.

10. In a portable, hand operated measuring rule, a flexible tape rule having indicia thereon, a housing for said tape, a support means on said housing assisting in the storage of the tape therein, a means associated with said tape resisting the unwinding thereof and assisting in the retraction, a first channel member supporting the tape housing with the end portion of said tape passing through and supported therein and with the tape indicia visible at one place thereon, a second channel member slidably mounted in said first channel member for telescopic engagement therewith, catch means on one of said channels preventing the disengagement of said channels in fully extended position, said tape extending across and being supported on said second channel, a third channel mounted in said second channel for telescopic engagement with said first and second channels, said tape having the outward end thereof fixed on said third channel and having a portion thereof extending across and being supported therein, an index on one of said channels indicating on the tape the exact length of said channels in fully retracted condition, whereby extending said channels extends said tape on a rigid support surface indicating distance on said tape at said index.

11. The device of claim 10 having a means for detachably retaining said tape on said third channel, and a plurality of attaching positions adapted selectively to receive said tape detachably attached thereto, whereby the outward end of said tape is re-positionable to be locked in one of several positions on said channels in order to adjust and zeroize the rule according to any two fixed linear points establishing an initial distance reading on said rule.

12. The device in claim 10 additionally having a rigid rule positioned on said third channel and extending inwardly therein substantially parallel to the transverse plane of said tape, indicia on said rule reading inwardly from the terminal end of said third channel, and adjustable lock means for movably locking said rule on said third channel.

References Cited in the file of this patent
UNITED STATES PATENTS

| | | |
|---|---|---|
| 563,579 | Fearon | July 7, 1896 |
| 844,536 | Prindle | Feb. 19, 1907 |
| 1,140,330 | Merlin | May 18, 1915 |
| 1,203,504 | Diskin | Oct. 31, 1916 |
| 2,667,190 | Delano | Jan. 26, 1954 |
| 2,729,897 | Smith | Jan. 10, 1956 |